(12) United States Patent
Hüner et al.

(10) Patent No.: US 7,045,207 B2
(45) Date of Patent: May 16, 2006

(54) FRICTION BODIES COMPRISING METAL-INFILTRATED, FIBER-REINFORCED POROUS CARBON

(75) Inventors: Ronald Hüner, Baar (DE); Xaver Rothmair, Gersthofen (DE)

(73) Assignee: SGL Carbon AG, (DE)

( * ) Notice: Subject to any disclaimer, the term of this patent is extended or adjusted under 35 U.S.C. 154(b) by 0 days.

(21) Appl. No.: 10/854,821

(22) Filed: May 26, 2004

(65) Prior Publication Data

US 2004/0241412 A1 Dec. 2, 2004

(30) Foreign Application Priority Data

May 30, 2003 (DE) ................. 103 24 691

(51) Int. Cl.
*B32B 5/16* (2006.01)
(52) U.S. Cl. ............... 428/323; 428/293.4; 428/304.4; 428/311.51; 428/312.2; 428/320.2; 428/293.1; 428/294.4
(58) Field of Classification Search ............... 156/148, 156/189, 195; 264/42, 85, 29.6, 29.7; 428/294.4, 428/340, 312.2, 323, 293.1, 293.4, 320.2, 428/311.51, 304.4
See application file for complete search history.

(56) References Cited

U.S. PATENT DOCUMENTS

| | | | |
|---|---|---|---|
| 6,110,268 A | 8/2000 | Gross et al. | |
| 6,183,583 B1 * | 2/2001 | Duval et al. | ................. 156/148 |
| 6,261,981 B1 | 7/2001 | Dietrich et al. | |
| 6,265,071 B1 | 7/2001 | Gross et al. | |
| 6,342,171 B1 * | 1/2002 | Murdie et al. | ................. 264/42 |
| 2002/0142146 A1 | 10/2002 | Gadow et al. | |
| 2003/0180527 A1 | 9/2003 | Bauer et al. | |

FOREIGN PATENT DOCUMENTS

| | | |
|---|---|---|
| DE | 197 11 829 | 9/1998 |
| DE | 197 27 585 | 2/1999 |
| EP | 1 357 310 | 10/2003 |
| WO | WO-98/42634 | 10/1998 |

* cited by examiner

*Primary Examiner*—Merrick Dixon
(74) *Attorney, Agent, or Firm*—Connolly Bove Lodge & Hutz LLP

(57) ABSTRACT

Friction bodies made of a fiber-reinforced porous carbon material in which the reinforcing fibers are present in the form of woven fabrics, short fibers and/or long fibers and whose pores are filled with metals, wherein carbides of the metals filling the pores are present in the material in a mass fraction of not more than 10%, a process for their production and the use thereof in brake and clutch systems.

12 Claims, No Drawings

FRICTION BODIES COMPRISING METAL-INFILTRATED, FIBER-REINFORCED POROUS CARBON

The invention relates to friction bodies comprising metal-infiltrated, fiber-reinforced porous carbon. It further relates to a brake or clutch system comprising at least one brake or clutch disc, where the brake or clutch disc comprises metal, a cermet material or ceramic reinforced with carbon fibers, and at least one friction lining which comprises a friction body comprising metal-infiltrated, fiber-reinforced porous carbon.

Brake and clutch linings are usually organically bound materials or they comprise sintered metals which are generally employed in combination with brake or clutch discs made of cast iron. Organic materials are usually bound by means of phenolic resins which decompose above 300° C., and which undergo a very rapid thermal decomposition process above about 600° C. Materials bound in this way are not suitable as "lifetime components" because of the relatively high temperatures involved in braking and operating the clutch, in particular in conjunction with brake or clutch discs comprising ceramic materials; rather, they have to be replaced a number of times during the life of the vehicle concerned.

Brake or clutch disc materials based on ceramic materials reinforced with carbon fibers have, due to the hard, wear-resistant ceramic component, the advantage of a very long life and a low weight. However, due to their relatively low heat capacity, brake discs made of these materials generally experience even higher temperatures in operation than do comparable discs made of cast iron, so that organically bound brake linings are worn away very quickly.

Ceramic friction bodies have a high hardness. Friction pairings in which a material having a hardness similar to that of the brake or clutch disc is used for the friction linings have the disadvantage that the disc thus wears to the same extent as the friction linings; this rules out use of such brake discs or clutch discs over the total life of the assembly in which these are present.

From U.S. Pat. No. 6,110,268, a brake unit is known in which a brake disc comprising a carbon-ceramic composite is combined with a friction lining based on sintered metal having a coefficient of friction of from 0.3 to 0.5. This combination has the disadvantage that the comfort afforded by this friction pairing is very poor because of the high hardness and the braking noise. The opportunity of additionally introducing additives acting as abrasives or lubricants into the formulations is restricted by the sintering process.

Compared to this prior art, it is an object of the invention to provide materials for friction bodies which have a greatly increased wear resistance, particularly at elevated temperature, but do not have an adverse effect on the wear behavior of the brake or clutch disc combined therewith and also have a higher compressibility than sintered materials and in operation display low wear which is nevertheless higher than that of the friction layer of the brake or clutch disc. The composition of the friction bodies (matrix, reinforcing fibers) should be variable and be able to be matched to the intended application in a simple manner.

This object is achieved by a friction body comprising a fiber-reinforced porous carbon material in which the reinforcing fibers are present in the form of woven fabrics, short fibers and/or long fibers and whose pores have been filled with metals by infiltration, where the material can optionally further comprise lubricants and/or abrasives.

The reinforcing fibers present in the friction body are, in particular, carbon fibers and/or inorganic fibers, but preferably carbon fibers. These can be coated with at least one protective layer of carbon, for example a layer produced by pyrolysis of resins or pitches, boron compounds or phosphorus compounds, compounds comprising boron and phosphorus and, if desired, third elements or combinations thereof which have been deposited on the fibers. The friction body can also contain silicon carbide fibers, silicon nitride fibers, silicon carbonitride fibers and fibers of compounds of silicon, boron, carbon and nitrogen in any ratios.

The term "short fibers" refers to fibers having a length of up to 5 mm, while long fibers are fibers whose length is at least 5.1 mm, preferably at least 6 mm and in particular at least 7.5 mm.

The mass fraction of reinforcing fibers in the friction bodies of the invention is at least 10%, preferably from 15% to 60% and particularly preferably from 20% to 55%, based on the mass of the friction body.

In the case of CFC materials ("carbon fiber reinforced carbon", CFRC), the matrix of the friction bodies of the invention comprises carbon and can further comprise inorganic polymers such as polysilazanes, substituted polysilazanes whose substituents are preferably boron and/or phosphorus and their decomposition products, and also metals.

The matrix preferably comprises mass fractions of from 20% to 75% of carbon and from 25% to 80% of metal. Particular preference is given to mass fractions of from 60% to 70% of carbon and from 30% to 40% of metal, based on the mass of the matrix.

Preferred metals are Cu, Sn, Ti, Cr, Mo, V, Mg, Fe, Mn, Al, Ni, Zr, Hf, Co, particularly preferably Cu and Sn, and also metals of the iron group and Si-containing alloys. The mass fraction of silicon in the silicon-containing alloys is not more than 20%, preferably not more than 10% and in particular not more than 5%, based on the mass of the alloy.

Further constituents can be abrasives in particle form, e.g. $SiO_2$ (mass fraction from 1% to 20%) and metal silicides and oxides (mass fraction from 0.5% to 20%), and also lubricating constituents in particle form, e.g. lamellar boron nitride and manganese sulfide (mass fraction in each case from 0.5% to 20%). In all cases, preference is given to a mass fraction range in each case of from 2% to 15%, in particular from 5% to 10%, based on the mass of the friction bodies.

It is important to the invention that carbides of the metals are not formed or are formed to only a minor extent by reaction of the carbon of the matrix or of the fibers. Carbides of the metals used for infiltration are therefore present in the material of the invention in a mass fraction of not more than 10%, preferably not more than 7% and in particular less than 5%, based on the mass of the material.

The invention also provides a process for producing friction bodies comprising a porous carbon material reinforced with carbon fibers, in which the reinforcing fibers are present in the form of woven fabrics, short fibers and long fibers and whose pores are completely or partly filled with metals, which comprises firstly shaping reinforcing fibers or woven fabrics of reinforcing fibers with a molding composition comprising, if desired, abrasives and/or lubricants and also carbonizable materials selected from among thermoset and thermoplastic polymers, resins and pitches (collectively also referred to as "binders") at elevated temperatures and/or under pressure to produce shaped bodies. This shaping is preferably carried out by pressing. Preference is given to the molding composition comprising reinforcing fibers in the form of woven fabrics or of short fibers, long fibers or mixtures thereof, with the mass fraction of these reinforcing fibers in the molding composition preferably being from 30% to 80%, particularly preferably from 35% to 60%. After the shaping process, the shaped parts are in the green state in which they can easily be shaped further by, for example, cutting or sawing.

The term "carbonizable" refers to materials which form carbon on heating to a temperature of from about 750° C. to about 1100° C. in the absence of oxygen, with the mass of carbon formed being at least 10% of the mass of the initial material.

The shaped parts in the green state are subsequently fired at the temperatures indicated above in a nonoxidizing atmosphere to produce porous bodies. These porous bodies comprise the reinforcing fibers and a porous carbon matrix which is formed by carbonization of the binder during the firing process.

In a further process step, these porous bodies are then infiltrated with liquid metal under reduced pressure or in vacuo to form the friction bodies of the invention. The temperature for this process step is advantageously selected so that it is at least about 10 K above the melting temperature of the metal or alloy used for infiltration. On the other hand, the temperature should be selected so that formation of carbides by reaction of the carbon of the matrix or possibly of the reinforcing fibers with the metal used for infiltration does not occur or occurs only to a minor extent. In these process steps, the external shape of the shaped parts is largely retained.

The friction bodies produced in this way can directly have the shape of a friction lining or can be sawn or cut from a metal-infiltrated plate-shaped shaped body. Shaping in the green state or in the carbonized state prior to infiltration with the metal is preferable.

If carbon fibers are used in the form of woven fabrics, these are oriented in the friction bodies comprising the materials of the invention so that their surface is preferably parallel to the friction surface of the friction lining. Preference is given to at least 20% of the area of the woven fabrics being aligned so that their surface is parallel to the friction surfaces.

The invention is illustrated by the examples below.

EXAMPLE 1

A mixture of mass fractions of 35% by mass of carbon fibers in the form of short fibers having a mean length of 3 mm and a diameter of from 8 to 10 µm, 10% of petroleum coke, (particle size fraction having a particle size of up to 45 µm), 35% of phenolic resin (®Bakelite SP 222 novolak), 1% of boron nitride (particle size fraction having a particle size of up to 45 µm), 4% of graphite (Graphitbergbau Kaisersberg, particle size up to 45 µm), 10% of pitch (®Carbores, carbon yield in accordance with ISO 6998: 85%, Rütgers VFT AG) and 5% of $Al_2O_3$ (particle size up to 10 µm, Alcoa) was intimately mixed in a mixer at room temperature for twenty minutes, this mixture was pressed by means of a hydraulic press to produce plates having a thickness of 20 mm and these were then heated at 700° C. in the absence of air in a furnace for five hours. The resulting plate-shaped parts were shaped to bring them to the desired final shape and dipped into liquid bronze at 920° C. under reduced pressure. In this step, the liquid metal penetrated into the pores of the carbonized shaped body. The parts were taken from the metal melt and cooled. The resulting shaped parts were ground on one flat side and applied by adhesive bonding to a metal support plate, with the ground side facing the support plate. The shaped part adhesively bonded onto the support plate was subsequently ground parallel to the side of the support facing away from the friction lining.

EXAMPLE 2

A mixture of mass fractions of 40% by mass of carbon fibers in the form of short fibers having a mean length of 3 mm and a diameter of from 8 to 10 µm, 10% of petroleum coke, (particle size fraction having a particle size of up to 45 µm), 40% of phenolic resin (®Bakelite SP 222 novolak) and 10% of pitch (®Carbores, carbon yield in accordance with ISO 6998: 85%, Rütgers VFT AG) was intimately mixed in a mixer at room temperature for twenty minutes. This mixture was pressed by means of a hydraulic press to produce plates having a thickness of 20 mm and these were then heated at 900° C. in the absence of air in a furnace for five hours. The resulting plate-shaped parts were dipped into liquid pitch and once again heated at 900° C. in the absence of air in a furnace for five hours and then dipped into liquid bronze at 920° C. under reduced pressure. The parts were taken from the metal melt and cooled and then shaped to bring them to the desired final shape. The resulting shaped parts were ground on one flat side and applied by adhesive bonding to a metal support plate, with the ground side facing the support plate. The shaped part adhesively bonded onto the support plate was subsequently ground parallel to the side of the support facing away from the friction lining.

EXAMPLE 3

A mixture of mass fractions of 20% of carbon fibers, 20% of silicon carbonitride fibers ($Si_{12}C_{40}N_{48}$), in each case in the form of short fibers having a mean length of 3 mm, 10% of petroleum coke (particle size fraction having a particle size of up to 45 µm), 40% of phenolic resin (®Bakelite SP 222 novolak), and 10% of pitch (®Carbores, carbon yield in accordance with ISO 6998: 85%, Rütgers VFT AG) was intimately mixed in a mixer at room temperature for twenty minutes. This mixture was pressed by means of a hydraulic press to produce plates having a thickness of 20 mm and these were then heated at 900° C. in the absence of air in a furnace for five hours. The resulting shaped parts were ground on one flat side and applied by adhesive bonding to a metal support plate, with the ground side facing the support plate, then dipped into liquid ferrosilicon at 920° C. under reduced pressure. The parts were taken from the metal melt and cooled and then shaped to bring them to the desired final shape. The shaped part adhesively bonded onto the support plate was subsequently ground flat.

Testing of such a friction material produced as described in example 1 in combination with a carbon-ceramic brake disc in an AK Master test (version 12/98) gave a wear of 6.4 g on the friction linings, while a test carried out under the same conditions using conventional friction linings bound with phenolic resin gave a wear of 40.5 g.

The invention claimed is:

1. A friction body comprising a fiber-reinforced porous carbon material in which the reinforcing fibers are present in the form selected from the group consisting of short fibers and long fibers and whose pores are filled with metals selected from the group consisting of Cu, Sn, Ti, Cr, Mo, V, Mg, Fe, Mn, Ni, Zr, Hf, Co and alloys thereof, wherein carbides of the said metals filling the pores are present in the material in a mass fraction of not more than 10%, based on the mass of the friction body.

2. The friction body as claimed in claim 1, wherein the mass fraction of reinforcing fibers is at least 10%, based on the mass of the friction body.

3. The friction body as claimed in claim 1, wherein the reinforcing fibers comprise carbon fibers.

4. The friction body as claimed in claim 1, wherein the reinforcing fibers comprise inorganic fibers selected from the group consisting of silicon carbide fibers, silicon nitride fibers, silicon carbonitride fibers and fibers of compounds of silicon, boron, carbon and nitrogen in any ratios.

5. The friction body as claimed in claim 1, wherein the matrix of the carbon material comprises metals selected from the group consisting of Cu, Sn, and alloys thereof.

6. The friction body as claimed in claim 1, wherein lubricants in particle form are present in the material in a mass fraction of 0.5% to 20%, based on the mass of the friction body.

7. The friction body as claimed in claim 1, wherein abrasives in particle form are present in the material in a mass fraction of 0.5% to 20%, based on the mass of the friction body.

8. A process for producing friction bodies as claimed in claim 1, which compris in a first step, producing a molding composition by mixing carbonizable materials selected from the group consisting of thermoset and thermoplastic polymers, resins and pitches with reinforcing fibers in the form of short fibers, long fibers or mixtures thereof, where the mass fraction of these reinforcing fibers in the molding composition is from 30% to 80%, in a second step, producing a shaped part from the molding composition by molding at elevated temperature and/or under pressure, in a third step, firing the shaped part by heating at a temperature of from about 750 □C to about 1100 □C in the absence of oxidizing gases to produce a porous body comprising reinforcing fibers and a porous carbon matrix which is formed by carbonization during the firing process, and in a fourth step, infiltrating the porous body with liquid metal selected from the group consisting of Cu, Sn, Ti, Cr, Mo, V, Mg, Fe, Mn, Al, Ni, Zr, Hf, Co and alloys thereof, under reduced pressure or in vacuo.

9. The process as claimed in claim 8, wherein abrasives and/or lubricants are mixed into the molding composition.

10. A brake system comprising the friction body as claimed in claim 1.

11. A clutch system comprising the friction body as claimed in claim 1.

12. The friction body of claim 1 which comprises a woven fabric made of reinforcing fibers.

* * * * *

UNITED STATES PATENT AND TRADEMARK OFFICE
CERTIFICATE OF CORRECTION

| | | |
|---|---|---|
| PATENT NO. | : 7,045,207 B2 | Page 1 of 1 |
| APPLICATION NO. | : 10/854821 | |
| DATED | : May 16, 2006 | |
| INVENTOR(S) | : Ronald Hüner et al. | |

It is certified that error appears in the above-identified patent and that said Letters Patent is hereby corrected as shown below:

Column 6, line 8, "temperature of from about 750□C to about 1100□C"

should read -- temperature of from about 750°C to about 1100°C --

Signed and Sealed this

Thirty-first Day of October, 2006

JON W. DUDAS
*Director of the United States Patent and Trademark Office*